May 13, 1947.    D. S. HUBBELL    2,420,540
CUPREOUS POWDER AND METHOD OF MAKING THE SAME
Filed June 29, 1945    2 Sheets-Sheet 2

INVENTOR
Dean S. Hubbell
BY J. Stanley Churchill
ATTORNEY

Patented May 13, 1947

2,420,540

UNITED STATES PATENT OFFICE 2,420,540

CUPREOUS POWDER AND METHOD OF MAKING THE SAME

Dean S. Hubbell, Sharpsburg, Pa., assignor to H. H. Robertson Company, Pittsburgh, Pa., a corporation of Pennsylvania Application June 29, 1945, Serial No. 602,399

3 Claims. (Cl. 75—0.5)

This invention relates to a novel cupreous powder and to methods of making the same.

The object of the invention is to produce a novel cupreous powder which is adapted for various industrial and commercial uses as an available source of chemical copper, and which is characterized by a high degree of reactivity when treated with various reagents, and in addition which possesses a relatively high degree of stability against oxidation in the air.

A further object of the invention is to provide novel methods of producing the present cupreous powder by which the same may be produced at reasonable expense in a novel and practical manner.

Figure 1:
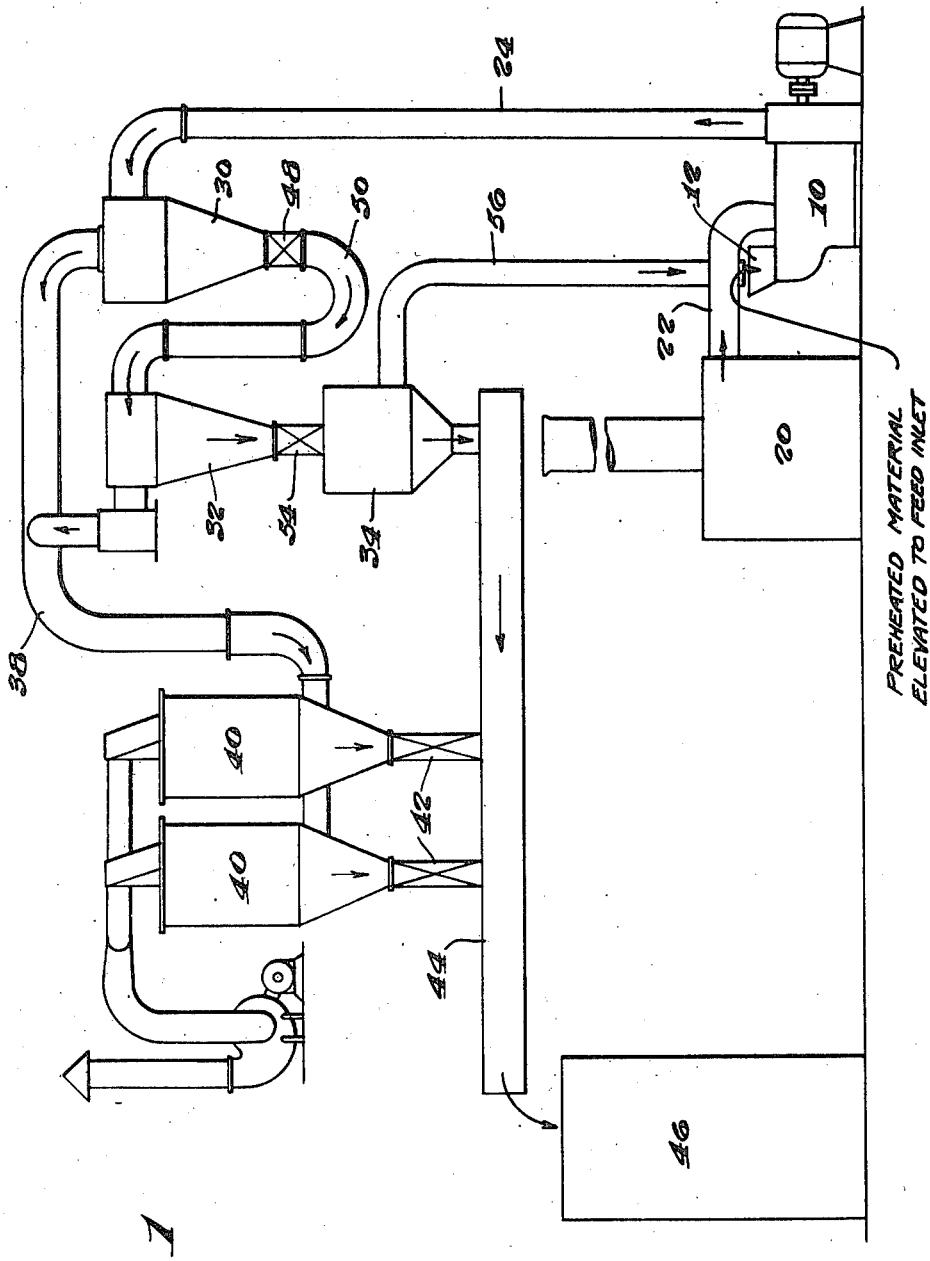
Figure 2:
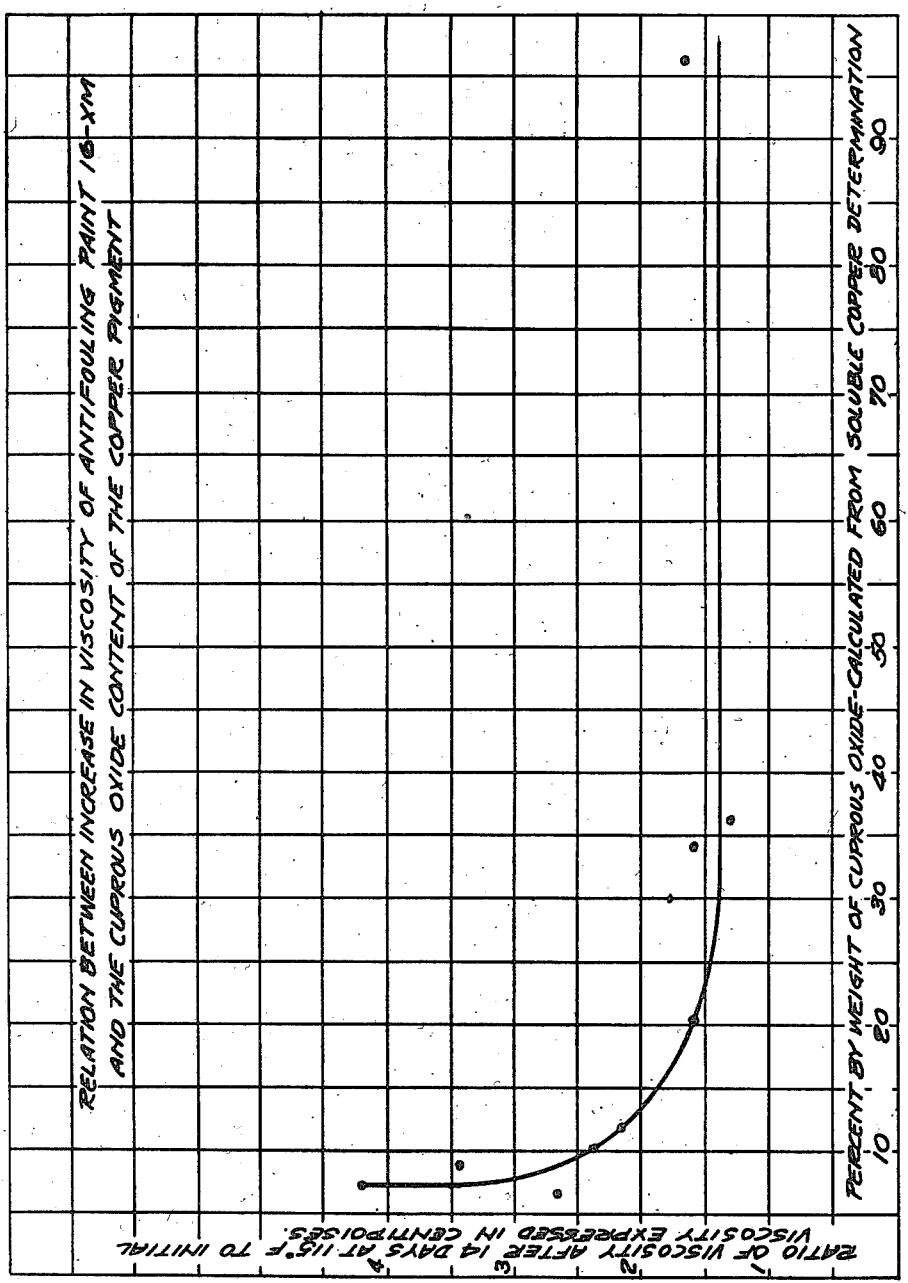

In the drawing Fig. 1 illustrates more or less diagrammatically the preferred apparatus for producing the present cupreous powder, and Fig. 2 is a graph to be referred to.

Prior to the present invention metallic copper in powdered form has been used principally for metallurgical purposes in a substantially pure state, and to a limited degree for purposes where its function is chemical rather than metallurgical in nature, that is where it is intended as a source of available copper. Examples of such latter uses include the use of finely divided copper in stabilizing magnesium oxychloride cements, as the toxic ingredient in antifouling paints, and as a dusting powder or spray for controlling fungi. In practice considerable difficulty has been experienced in the use of commercial forms of metallic copper powder because of the tendency of the same to oxidize in the air into the black or cupric form.

The present invention contemplates a novel cupreous powder which may be produced from cement copper or precipitated copper as produced by the refineries or mines by subjecting the same to treatment to finely divide the dendritic copper particles and thereby procure an extremely large and much greater surface area as compared with the present copper powder commercially available, while at the same time to produce upon the individual copper particles thin protective films of cuprous oxide and by which the mass of copper particles are rendered relatively stable in the air against oxidation, permitting the product to be stored for relatively long periods of time without oxidation and yet to retain its original efficient and high reactivity to various reagents.

Cement copper or copper precipitate as produced at the refineries or mines comprises a brownish red sludge, wherein the copper is present in the form of a peculiar crystalline form of copper particle dendritic in nature and capable of being easily crushed when subjected to impact or crushing as by passing through one of several types of hammermills, jet pulverizers and ball mills. The commercial cement or precipitated copper in the condition obtainable from the refineries or mines contains impurities which may include small amounts of compounds and salts of iron, aluminum, silica and others, such as iron sulphate, aluminum salts and various silicates. These impurities do not detract from the utility of the present cupreous powder for its intended purposes but on the other hand these acid forming materials appear to materially assist in preserving the stability of the cupreous powder against oxidation in the air as will be described. Along with such impurities, commercial cement copper contains cuprous oxide in varying amounts from a few percent up to 40% and in some instances more, depending upon the method employed in precipitating the material at the mines. For example, cement copper obtained from Western mines has averaged about 18% cuprous oxide, whereas a cement copper obtained from Eastern sources averaged in the neighborhood of 40 to 60% of cuprous oxide.

When such copper sludge was air dried according to prior practice the product blackened resulting in a product having a high cupric oxide content, and such a product has been regarded as unsatisfactory for the production of antifouling paints and for many other industrial purposes. Freshly precipitated copper has also been dried in a reducing atmosphere to produce a bright oxide free cupreous powder which is relatively unstable against oxidation in the air tending to blacken quickly and accordingly has not been satisfactory for the production of antifouling paints and for many other industrial purposes.

In order to produce the present stable-in-the-air cupreous pigment the cement or precipitated copper sludge preferably in its unrefined condition and in any event without being subjected to chemical treatment which would effect the removal of substantial amounts of its cuprous oxide content, is shipped from the mine or refinery in a damp state and in such a manner as to minimize further oxidation of the copper and so that the cement or precipitated copper when received is substantially free from cupric oxide. This may be accomplished in practice by shipping the damp material in a tight container or by shipping it in a bulk mass in which the moisture content is so high that all interstices between the particles are filled with water and the air is consequently excluded. Experience has shown that a minimum amount of water of from 22 to 27% will accomplish this result. The wet sludge is subjected to treatment to remove the water therefrom as rapidly as possible. Accordingly the removal of moisture is preferably effected as rapidly as possible in order to shorten the interval during which the drying copper particles are exposed to severe oxidizing conditions. This may be accomplished in any of several types of drying equipment in which moisture is rapidly evaporated and swept away from relatively thin layers of the powder at temperatures not greatly in excess of the boiling point of water. For example, direct or indirect fired rotary driers; and heated surfaces over which relatively thin layers of the powder are moved; conveyors that move the powder in relatively thin layers while it is heated by radiation or by hot gases have been found satisfactory.

Satisfactory results have also been obtained by subjecting the material to drying during the crushing operation providing the moisture content is not exceedingly high, employing hot products of combustion as the circulating medium in a commercially available high speed unit pulverizer of the impact type, which may be equipped with air separation and with an air drying system for evaporating moisture from materials during the grinding process, additional air being introduced into the mill and circulated during the operation.

In practice it has been found to be desirable to accomplish the drying in two steps, one immediately following the other. The damp powder is first given a preliminary drying down to approximately 10% of water by one of the driers mentioned above, then transferred immediately to the impact or crushing mill where the remainder of the moisture is most completely removed, preferably to 0.2–0.4% during grinding by the hot gaseous circulating medium. Dust in the primary drier is avoided by discharging the product at a moisture content that is above the point where dust is produced. This partially dried powder must be immediately transferred to the impact mill and given its final drying to remove the moisture as completely as possible, as even one or two per cent of moisture causes oxidation of the copper to the cupric state, resulting in a blackened and commercially unsatisfactory product.

The next step in the process of producing the cupreous product comprises subjecting the sludge to crushing. The crushing may be accomplished by passing the material through a mill such as a hammermill or the jet pulverizer and through which air is preferably circulated along with hot products of combustion: the impacting action upon the cement copper not only crushes it to extreme fineness wherein the particle size is reduced to a few microns but also produces the most unexpected result of imparting to the material great stability in air, that is the ability to resist further oxidation when exposed to atmospheric conditions.

In Fig. 1 of the drawing, I have illustrated more or less diagrammatically the preferred apparatus for producing present cupreous powder wherein 10 represents the crushing mill preferably of the commercially available high speed unit pulverizer of the impact type above referred to. The precipitated or cement copper after having been subjected to pre-drying as above described to reduce its moisture content to the neighborhood of 10% is elevated to a hot mill from which it is fed to the feed inlet 12 of the impact or crushing mill 10. The rate of feed is preferably maintained so as to keep the impact mill loaded to its full capacity. The heat for flash-drying the material while it is being crushed is produced by a pre-mix air heater which may comprise any of the commercially available direct-fired non-recirculating air heating units diagrammatically illustrated at 20. In the operation of the air heater 20, gas and air are premixed and burned in the heater and with additional raw air and the products of combustion from the furnace 20 are conducted to the casing of the impact or crushing mill 10 through the pipe 22 affording very little opportunity for the gases to cool. Large volumes of air are introduced into the air circulating system of the impact mill 10 along with these hot gaseous products of combustion, insuring an oxidizing atmosphere. In practice, the temperatures of these combustion gases as they enter the mill fluctuate greatly depending upon the demand on the furnace 20 usually varying between 700° and 1000° F. as the hot gases meet the damp cement copper within the impact mill 10. The temperature of the gases is quickly lowered and flash-drying of the cement copper takes place. During the passage of the cement copper through the mill 10 the material is crushed, and as the material leaves the mill it is conducted through a pipe 24 to the first of a series of classifiers indicated at 30, 32 and 34. The first classifier 30 may comprise a well-known cyclone type and the operation of which serves to separate the lighter dust from the product of the mill, such lighter dust being carried with the air out of the top of the cyclone and conducted through intake mains 38 to dust collectors 40 equipped with woolen dust collecting tubes or bags. The dust collectors may comprise any usual or preferred form obtainable upon the market and preferably are equipped with tube shaking apparatus and operate periodically to discharge the fine cupreous dust from the bottom of the dust collector columns and through air locks 42 whence the dust is conveyed by an enclosed screw conveyor 44 to the finished material containers 46.

The coarser material dropped from the air stream in the first cyclone 30 is discharged from the bottom thereof through an air lock 48 and conveyed by an air stream to the second cyclone 32 through the pipe 50. The fine material emerging from the top of the second cyclone is conducted into the inlet main 38 leading to the dust collectors 40 and finds its way eventually in the manner described to the finished material containers 46. Material dropped out of the air stream in the second cyclone 32 passes to the bottom of the cyclone and is discharged through an air lock 54 into an additional separator 34 which preferably may be of the mechanical type and operates to further separate the finer dust from the material and to discharge it into the screw conveyer 44 leading to the finished material container. Preferably the coarse material being discharged from the mechanical separator is again introduced into the mill 10 through a pipe 56 for re-grinding.

The temperature at the top of the first cyclone is preferably maintained in the vicinity of 240° F. and from this point on the temperature gradually falls being maintained above the dew point to avoid condensation of the moisture on the dust collecting bags. The capacity of the crushing mill 10 is relatively large and the time that the material is dried and crushed in its passage through the mill is relatively short, only a matter of seconds, and while the classifying apparatus above described is preferred other types may be used if found of advantage. Extended research has been conducted including chemical analyses to discover the reasons for the unexpected results obtained. The results of such analyses disclosed that the cuprous oxide content was not appreciably increased during the passage of the material through the mill and further that repeated or additional passes through the mill did not effect any further oxidation of the copper to cuprous oxide. X-ray studies and also inspection of polished surfaces cut through the particles and viewed with reflected light at 1000 diameters demonstrated that the cupreous powder resulting from the treatment described comprises copper particles having thin surface films of cuprous oxide thereon, which appear to serve as protective films therefor. Among the film covered copper particle occasional small grains of oxidized copper ($Cu_2O$) were disclosed which obviously afforded no protection for the copper particles. Examination of cupreous products produced in accordance with the present invention from cement copper from different sources and which contained widely varying amounts of cuprous oxide, as for example variations from 18 to 42% cuprous oxide, demonstrated that the cuprous oxide surface film was of substantially the same thickness irrespective of the original cuprous oxide content. The original granular form of the cuprous oxide in the unprocessed cement copper indicates its unprotective nature and explains the reason why the unprocessed cement copper readily oxidizes to cupric oxide.

My research has indicated that the novel air stable and highly reactive cupreous powder may be produced from cement or precipitated copper having a widely varying cuprous oxide content, and the lower limit of cuprous oxide content required may be stated as being sufficient to be discernible by metallographic methods and to be identified by X-ray diffraction. In the neighborhood of something over 1 to 2% of cuprous oxide appears to be the minimum, preferably from 5 to 15%. When such minimum amount of cuprous oxide is present it has been found that the present process results in the production of a cupreous powder wherein the fine copper particles are coated with a thin protective film of cuprous oxide.

In explanation of the production of the air stable and highly reactive cupreous powder as deduced from the foregoing evidence, it will be observed that, as above stated, the unrefined cement copper, constituting the raw material which is fed to the crushing mill, contains metallic copper particles of varying sizes in the form of friable copper dendrites and that the cuprous oxide, which may vary widely in amount as above set forth, exists in the form of solid masses or grains of varying size and which are distributed throughout the cement copper. Presumably some cuprous oxide exists on the surface of the copper particles but probably in the form of a loosely adhering scale or excrescence and not in the form of a continuous film covering or completely surrounding or enclosing the copper particles. When this cement copper is subjected to the hammering action of the mill, these friable particles are broken apart and the operation is continued until the average particle diameter of the ground or crushed product is a few microns, and in commercial practice a fineness of the order of two microns is easily obtained. The new metallic surfaces produced by the crushing and subdivision of the particles in the mill are produced at a time when the particle is hot as a result of the impact and these surfaces are swept by an atmosphere that is at least somewhat oxidizing in nature. As a result, it is believed that a cuprous oxide film is formed on the surfaces of the individual particle and this fact is borne out by metallographic studies. Furthermore, experience and research justifies the belief that the cuprous oxide film produced under these conditions is continuous and completely surrounds and serves to protect the metallic copper particles from further oxidation. For example, it is known that high temperature films of oxide on iron are more protective against further oxidation than low temperature films and furthermore that films put on by shot peening are quite resistant to further oxidation. Presumably this peening does several things—it heats the surface momentarily due to the impact and it also does some work on the film produced, probably spreading it around, compacting it and closing up the discontinuities. The action that the cupreous particles receive can be pictured as very similar to this peening for the hammermill or jet pulverizer accomplish much of their result by causing particles to strike each other. Thus the particles in addition to being compacted by the action of the hammers of the mill, peen each other, producing on each other a film that is continuous and serves as a barrier to further oxidation. This protective film is very thin, as shown by the metallographs, qualitatively estimated as a small fraction of a micron, but there are many examples of extremely thin protective films on metal surfaces, i. e., aluminum. Here, then, is an explanation of the fact that while the copper powder is remarkably stable in air, it is highly reactive in certain solutions. In these solutions the thin protective oxide coating is removed and an enormous metallic surface is exposed. The solution rate of this exposed particle may be accelerated by the fact that metallic copper and cuprous oxide lie in close proximity and thus contribute to galvanic corrosion by creating a large number of small couples.

As indicating the particle size of the cupreous pigment produced by the impaction methods above described, the following results of comparative tests show a reduction in particle size with a resulting increase in surface area of the particles.

FEED (COPPER PRECIPITATE) TO THE MILL

| | Grind #1 | Grind #2 |
|---|---|---|
| Less than— | Per cent | Per cent |
| 15 microns | 95.7 | 94.0 |
| 10 microns | 91.8 | 91.6 |
| 7.5 microns | 84.8 | 81.3 |
| 5 microns | 58.5 | 60.0 |
| 2.5 microns | 8.5 | 12.9 |
| Estimated from calculations surface area of particles, sq. cm./gm | 2,160 | 2,161 |

PRODUCT (OF THE MILL)

*Grind #1*

Less than—
  20 microns _____ per cent __ 99.5
  15 microns _____ do ____ 97.7
  10 microns _____ do ____ 95.8
  7.5 microns _____ do ____ 92.7
  5 microns _____ do ____ 78.2
  2.5 microns _____ do ____ 24.3
  Surface area _____ sq. cm./gm __ 3,140

Grind #2

Less than—
- 20 microns_____per cent__ 99.5
- 15 microns_____do____
- 10 microns_____do____ 95.3
- 7.5 microns_____do____ 92.0
- 5 microns_____do____ 80.0
- 3.5 microns_____do____ 50.0
- 2.5 microns_____do____ 25.0
- 1.25 microns_____do____ 2.0
- Surface area_____sq. cm./gm__ 3,140

When the copper precipitate was passed through a mill of the jet pulverizer type the following results were obtained:

Less than—
- 20 microns_____per cent__ 98
- 15 microns_____do____ 97
- 10 microns_____do____ 93.5
- 7.5 microns_____do____ 89.3
- 5 microns_____do____ 81.0
- 3.5 microns_____do____ 66.1
- 2.5 microns_____do____ 44.5
- 1.5 microns_____do____ 10.0
- 1.25 microns_____do____ 5.4
- Surface area_____sq. cm./gm__ 3,545

The true specific gravity of the present cupreous product as measured and calculated is as follows:

From Western precipitate—
- Calculated composite specific gravity___ 7.30
- Measured composite specific gravity____ 7.37

From pyrites precipitate—
- Calculated composite specific gravity___ 6.45
- Measured composite specific gravity___ 6.37

The apparent specific gravity of the cement or precipitated copper is modified as a result of the crushing operation. Two principal effects contribute to this modification. One effect is the extreme fineness and compactness of the crushed product as distinguished from the dendritic form of the original cement or precipitated copper, and on the other hand the tendency of the entrapped air is to make the product more bulky. These two effects more or less offset one another with the result that the apparent specific gravity of the present cupreous product may be more or less than that of the original cement or precipitated copper.

The present antifouling product may be used with advantage in known formulations of antifouling paints, the principal requisite being that the vehicle permit the passage of the sea water into contact with the copper particles. In other words, it is desirable that the vehicle be such as to produce a film which is not too waterproof.

A typical formulation of a paint is as follows:

|  | Per cent |
|---|---|
| Antifouling pigment | 42.2 |
| Rosin | 21.1 |
| Hydrogenated methyl abietate | 10.6 |
| Chlorinated rubber | 1.4 |
| Diatomaceous silica | 7.1 |
| Naphtha | 17.6 |

Cuprous oxide has proven to be more desirable than metallic copper for general use as an antifouling pigment in antifouling paints because of the tendency of the metallic copper to hasten the corrosion of the steel plates when the paint is applied over steel, this galvanic corrosive effect being produced upon exposure to the sea water.

The present cupreous product and the antifouling paint embodying the same exhibits a minimum corrosive effect when applied to the steel hulls of ships and has been generally and commercially accepted as being more desirable for this reason than cuprous oxide.

The present cupreous product has however been definitely found to possess a much higher leach rate in sea water than cuprous oxide and consequently the antifouling paint embodying the same is more efficient in inhibiting marine growth than comparable paints embodying cuprous oxide.

Comparative leach rate tests gave the following results:

*4-hour leach rate determinations, expressed as parts per million*

|  | Cuprous Oxide (P. P. M. Cu.) | New Cupreous Pigment (P. P. M. Cu.) |
|---|---|---|
| Test #1 | 0.4 | 4.0 |
| Test #2 | 0.5 | 2.0 |
| Test #3 | 0.5 | 2.0 |
| Test #4 | 0.4 | 2.0 |

These and other tests establish the fact that the present cupreous product has a leach rate substantially greater than cuprous oxide, and experience has shown that its efficiency in inhibiting marine growth is proportionately greater than cuprous oxide. When the present cupreous powder is utilized as the antifouling pigment in an antifouling paint, research has demonstrated that the relationship between the amount of cuprous oxide in the present cupreous powder has an important effect upon the viscosity of the paint into which it is incorporated. All prior copper or copper oxide powders when embodied in antifouling paints appear to develop an undesirable jellying or substantial increase in viscosity after standing. The graph shown in Fig. 2 illustrates the results of research to determine the relation between the increase in viscosity of an antifouling paint embodying the present cupreous powder and the cuprous oxide content of the cupreous powder. Consideration of the graph shows that when the amount of cuprous oxide is decreased to the neighborhood of 10%, the thickening or undesirable increase in viscosity of the paint rises very rapidly. Accordingly, it is preferred that cuprous oxide content of the present cupreous powder for most desirable results as an antifouling pigment should be at least about 10% and preferably slightly more.

As above pointed out, cement or precipitated copper in the condition in which it is produced at the mines or refineries contains substantial impurities particularly iron sulphate and aluminum salts. In accordance with the present process, these impurities are not removed so that the present cupreous copper powder contains substantial but minor amounts of these impurities. These impurities contribute to the stability of the cuprous films which serve to protect the copper particles from undesired oxidation into the cupric state because of the fact that when exposed to moisture these impurities hydrolyze to form an environment which is acidic in nature and which serves to stabilize the protective cuprous oxide film. It has been recognized, as illustrated in United States Letters Patent 2,184,617, that cuprous oxide is greatly enhanced if it is kept in an acid environment and the presence of the acid-forming salts as iron sulphate and aluminum salts serves, in the present cupreous product, to insure, in the presence of the small amount of moisture, the desired acidic environment. That these salts have the effect of producing the desired acidic environment can be demonstrated by subjecting cement copper or copper precipitate to washing with distilled water until the water in contact with it is neutral. Thereafter if this water is left in contact with the cement copper or copper precipitate, it will be noticed after a lapse of a period of time that the water has become acidic. This appears to be due to the hydrolysis of these salts slowly producing an acidic environment in which cuprous oxide film produced on the individual particles of the present cupreous product is most stable.

This application is a continuation of my application Serial No. 489,725, filed June 4, 1943, and copending with my applications Serial No. 602,397, filed June 29, 1945, titled "Antifouling coating and pigment," and Serial No. 602,398, filed June 29, 1945, titled "Cement."

Having thus described the invention, what is claimed is:

1. As a new article of manufacture, a cupreous powder stable in the air, highly reactive and providing a source of available copper for various chemical purposes comprising a finely divided cupreous powder, the major portion of the particles of which are a few microns in size, and having as a principal constituent friable metallic copper core particles surrounded by protective surface films of cuprous oxide inhibiting oxidation in the air, said films being relatively thin as compared with the size of the enclosed copper cores, the amount of cuprous oxide on the individual cores being at least sufficient to be identified by present X-ray diffraction methods.

2. The method of making an air-stable cupreous powder which comprises the steps of: subjecting wet friable copper precipitate in its unrefined condition to a pre-drying operation to rapidly reduce the moisture content thereof sufficiently to condition the same for flash-drying; then immediately subjecting the same to an impacting operation and, simultaneously with said impacting operation, flash-drying the same in an oxidizing atmosphere to reduce the moisture content to about 0.2% to 0.4% and to form finely divided copper core particles surrounded by relatively thin protective surface films of cuprous oxide.

3. The method of making an air-stable cupreous powder, which comprises the steps of: subjecting wet friable copper precipitate containing a moisture content in excess of 10% in its unrefined condition to a pre-drying operation to reduce the moisture content thereof to about 10%, and then immediately subjecting the same to an impacting operation and, simultaneously with said impacting operation, quick drying the same in an oxidizing atmosphere, to thereby form finely divided copper core particles surrounded by relatively thin protective surface films of cuprous oxide and to reduce the moisture content to about 0.2% to 0.4%.

DEAN S. HUBBELL.

REFERENCES CITED

The following references are of record in the file of this patent:

UNITED STATES PATENTS

| Number | Name | Date |
| --- | --- | --- |
| 946,738 | Lang | Jan. 10, 1910 |
| 1,257,943 | Howard | Feb. 26, 1918 |
| 1,856,661 | Sherwood | May 3, 1932 |
| 2,112,497 | Kramer | Mar. 29, 1938 |
| 2,200,369 | Klinker | May 14, 1940 |

OTHER REFERENCES

Mellor, Comprehensive Treastise on Inorganic and Theoretical Chemistry, vol. 3, 1923 edition, pages 69 and 70.